(12) United States Patent
Kakiwaki

(10) Patent No.: US 8,232,864 B2
(45) Date of Patent: Jul. 31, 2012

(54) ELECTRONIC KEY SYSTEM, PORTABLE WIRELESS DEVICE, AND VEHICLE MANAGEMENT METHOD

(75) Inventor: Yuka Kakiwaki, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 676 days.

(21) Appl. No.: 12/295,588

(22) PCT Filed: Mar. 28, 2007

(86) PCT No.: PCT/JP2007/056680
§ 371 (c)(1),
(2), (4) Date: Jul. 1, 2009

(87) PCT Pub. No.: WO2007/114177
PCT Pub. Date: Oct. 11, 2007

(65) Prior Publication Data
US 2010/0013596 A1    Jan. 21, 2010

(30) Foreign Application Priority Data
Mar. 30, 2006 (JP) .................. 2006-096093

(51) Int. Cl.
*G05B 19/00* (2006.01)
*B60R 25/00* (2006.01)
*B60R 25/10* (2006.01)

(52) U.S. Cl. .......... 340/5.64; 340/5.72; 340/5.61; 340/426.15; 340/426.2; 340/426.36

(58) Field of Classification Search .......... 701/29
See application file for complete search history.

(56) References Cited

U.S. PATENT DOCUMENTS
6,567,746 B2 * 5/2003 Kuroda et al. ............... 701/212
2005/0283286 A1 * 12/2005 Kanda et al. .................. 701/29
2006/0012462 A1 * 1/2006 Teshima et al. ............. 340/5.61

FOREIGN PATENT DOCUMENTS
| JP | 2002-004675 | 1/2002 |
| JP | 2004-013628 | 1/2004 |
| JP | 2005-090049 | 4/2005 |
| JP | 2006-021687 | 1/2006 |
| JP | 2006028956 A | 2/2006 |

OTHER PUBLICATIONS

Japanese language office action dated Nov. 22, 2011 and its English language translation for corresponding Japanese application 2008508568.
Japanese language office action dated Jun. 14, 2011 and its English language translation for corresponding Japanese application 2008508568.

* cited by examiner

*Primary Examiner* — Benjamin C Lee
*Assistant Examiner* — Omeed Alizada
(74) *Attorney, Agent, or Firm* — DLA Piper LLP (US)

(57) ABSTRACT

An electronic key system includes a vehicle equipped with vehicle equipment, and a mobile phone having an electronic key function including ID information for the vehicle equipment. The vehicle equipment compares the ID information of the electronic key provided in the mobile phone with standard ID information of the vehicle equipment, makes the vehicle and/or the vehicle equipment perform a first operation when the ID information match and a second operation when the ID information cannot be detected. The vehicle equipment transmits history information along with the first and second operations to the mobile phone.

12 Claims, 5 Drawing Sheets

ELECTRONIC KEY SYSTEM, PORTABLE WIRELESS DEVICE, AND VEHICLE MANAGEMENT METHOD

TECHNICAL FIELD

The present invention relates to an electronic key system, a portable wireless device, and a vehicle management method for managing a history of, for example, a vehicle electronic key.

BACKGROUND ART

Patent Document 1 and the like propose an electronic key system using a key provided with an electronic key in control for locking/unlocking a vehicle and control for engine startup, performing control to unlock the vehicle and permitting engine startup when the electronic key stored in this key and inherent ID information of the vehicle equipment provided in the vehicle is corresponding, and performing control to lock the vehicle and not permit engine startup when an electronic key matching the inherent ID Information cannot be received.
Patent Document 1: Japanese Patent Publication (A) No. 2002-4675

DISCLOSURE OF INVENTION

Technical Problem

However, in the electronic key system disclosed in Patent Document 1 etc., it is not learned when the vehicle was used. For this reason, there is the disadvantage that, for example, when a user gets into the car and looks at a fuel gauge in order to use the vehicle, the user may feel the fuel has been reduced more than recognized by him and cannot recognize that a long time has past since last use, that is, when the vehicle was used last.

The present invention provides an electronic key system, a portable wireless device, and a vehicle management method enabling confirmation of the history of operation of the vehicle equipped with the vehicle equipment and operation of an attached equipment equipped with the vehicle.

Technical Solution

A first aspect of the present invention is an electronic key system controlling an operation of a vehicle equipped with a vehicle equipment and/or an operation of an attached equipment equipped with the vehicle with wireless communication between the vehicle equipment and a portable wireless device provided with an electronic key function including inherent ID information for the vehicle equipment. The vehicle equipment compares the ID information serving as the electronic key provided as the portable wireless device with standard ID information of the vehicle equipment and makes the vehicle equipped with the vehicle equipment and/or the attached equipment equipped with the vehicle performs a first operation when the both ID information is corresponding. When the ID information cannot be detected, it makes the vehicle equipped with the vehicle equipment and/or the attached equipment equipped with the vehicle performs a second operation. History information accompanying the first and second operations is transmitted to the portable wireless device.

Preferably, the portable wireless device has an announcement portion announcing that the history information is received from the vehicle equipment.

Preferably, when receiving the history information from the vehicle equipment, the portable wireless device transmits the history information to a destination set in advance.

A second aspect of the present invention is a portable wireless device provided with an electronic key function including ID information inherent to vehicle equipment. The portable wireless device comprise a transmission/reception portion performing wireless communication with the vehicle equipment, a storage portion storing at least the history information, and an announcement portion. Further, the portable wireless device has a control portion receiving the history information via the transmission/reception portion from the vehicle equipment when performing wireless communication with the vehicle equipment based on the electronic key, storing the received history information in the storage portion, and announcing the reception of the history information via the announcement portion.

Preferably, the history information is comprised so that it can be displayed via the announcement portion.

Preferably, when the history information is received, the history information is transmitted to a destination set in advance.

A third aspect of the present invention is a vehicle management method for managing a history of operation of a vehicle equipped with a vehicle equipment and/or operation of an attached equipment equipped with the vehicle with wireless communication between the vehicle equipment and a portable wireless device provided with an electronic key function including inherent ID information for the vehicle equipment. The vehicle equipment compares the ID information serving as the electronic key provided as the portable wireless device with standard ID information of the vehicle equipment and, when the both ID information is corresponding, makes the vehicle equipped with the vehicle equipment and/or the attached equipment equipped with the vehicle performs a first operation. When the ID information cannot be detected, it makes the vehicle equipped with the vehicle equipment and/or the attached equipment equipped with the vehicle performs a second operation. The history information accompanying the first and second operations is transmitted to the portable wireless device.

Advantageous Effects

According to the present invention, there is the advantage that it becomes possible to confirm histories of the operation of a vehicle equipped with a vehicle equipment and the operation of an attached equipment equipped with the vehicle.

EXPLANATION OF REFERENCES

10 . . . electronic key system, 20 . . . vehicle, 21 . . . vehicle equipment, 22 . . . door lock device, 30 . . . mobile phone, and 40 . . . transmission destination device.

BEST MODE FOR CARRYING OUT THE INVENTION

Below, an embodiment of the present invention will be explained based on the drawings.

Figure 1:
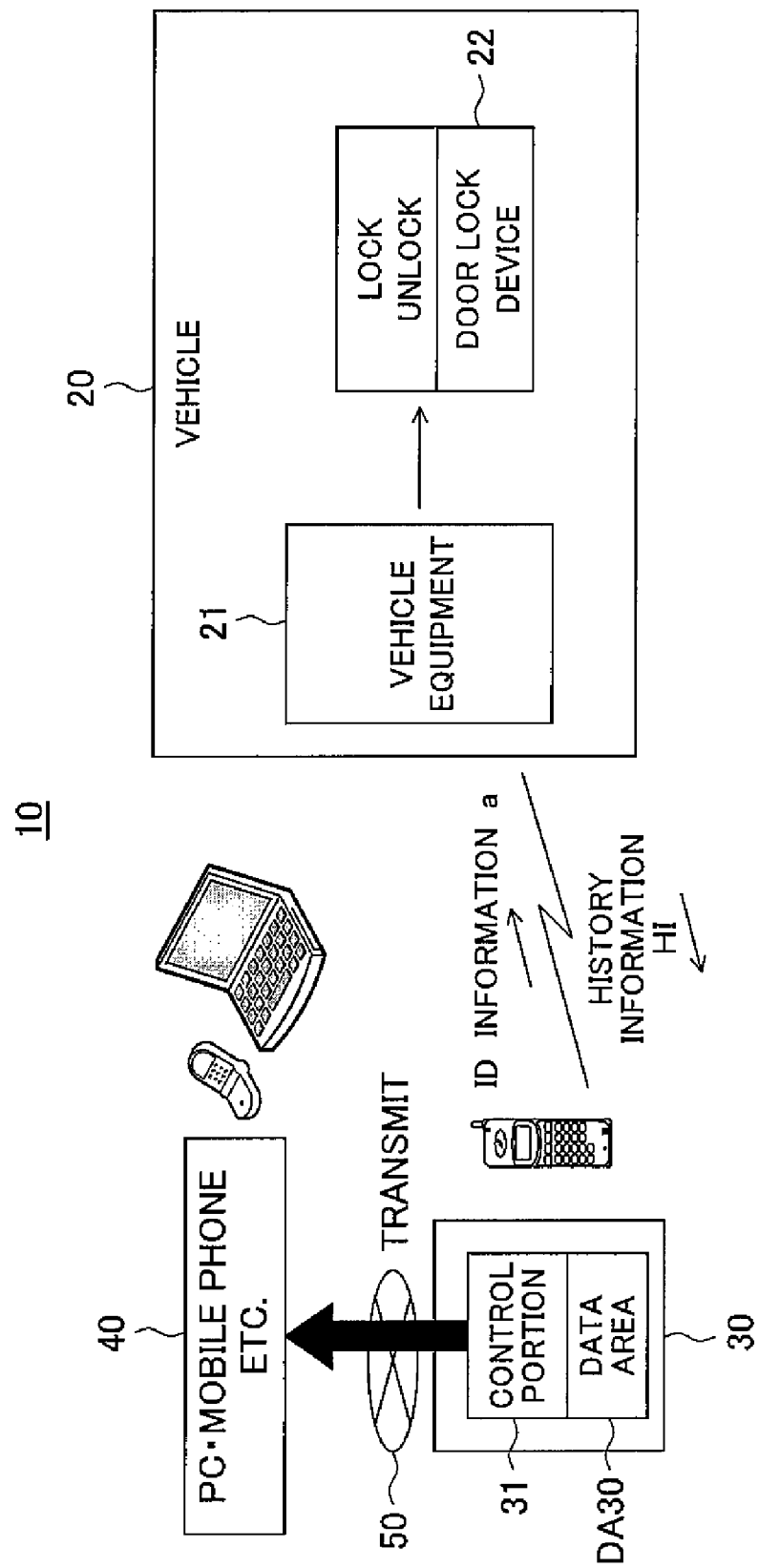
FIG. 1 is a block diagram showing an example of the configuration of an electronic key system according to an embodiment of the present invention.

FIG. 1 is a block diagram showing an example of the configuration of an electronic key system according to an embodiment of the present invention.

The present electronic key system 10 has a vehicle 20 equipped with a vehicle equipment 21, a mobile phone 30 provided with an electronic key function including an inherent ID information for the vehicle equipment 21, and a previously set transmission destination device (personal computer (PC), mobile phone, etc.) to which the mobile phone 30 transmits history information HI received from the vehicle equipment 21. The vehicle equipment 21 has a function of controlling the operation of the vehicle 20 equipped with the vehicle equipment 21 and/or the operation of the attached equipment equipped with the vehicle 20 with by wireless communication in a narrow band with the mobile phone 30.

The vehicle equipment 21 of the vehicle 20 compares ID information a of the electronic key provided as in the mobile phone 30 with standard ID information b of the vehicle equipment 21 and makes the vehicle 20 equipped with the vehicle equipment 21 and/or the attached equipment equipped with the vehicle 20 perform a first operation when the both ID information is corresponding. When the ID information a cannot be detected (including a time when the both ID information isn't corresponding), it makes the vehicle 20 equipped with the vehicle equipment 21 and/or the attached equipment equipped with the vehicle 20 perform the second operation. Further, the vehicle equipment 21 has a function of transmitting the history information HI along with the first and second operations to the mobile phone 30.

Here, as the first operation, an operation such as unlocking a door is included.

As the second operation, an operation such as locking the door is included.

The vehicle 20 has the vehicle equipment 21 recognizing the ID information a transmitted from the mobile phone 30 and sending a door lock or other instruction and a door lock device 22 locking/unlocking the door based on the instruction of the vehicle equipment 21. Further, the vehicle equipment 21 has a function of transmitting information locking/unlocking the door to the mobile phone 30.

The mobile phone 30 is equipped with a data area DA30 storing the history information sent from the vehicle equipment 21 whenever the function of the electronic key is utilized.

The mobile phone 30 can wirelessly communicate with the vehicle equipment 21, can transmit the inherent ID information a for the vehicle equipment 21, and has the function of transmitting the history information HI received from the vehicle equipment 21 to the transmission destination device 40 via a communication network 50.

Figure 2:
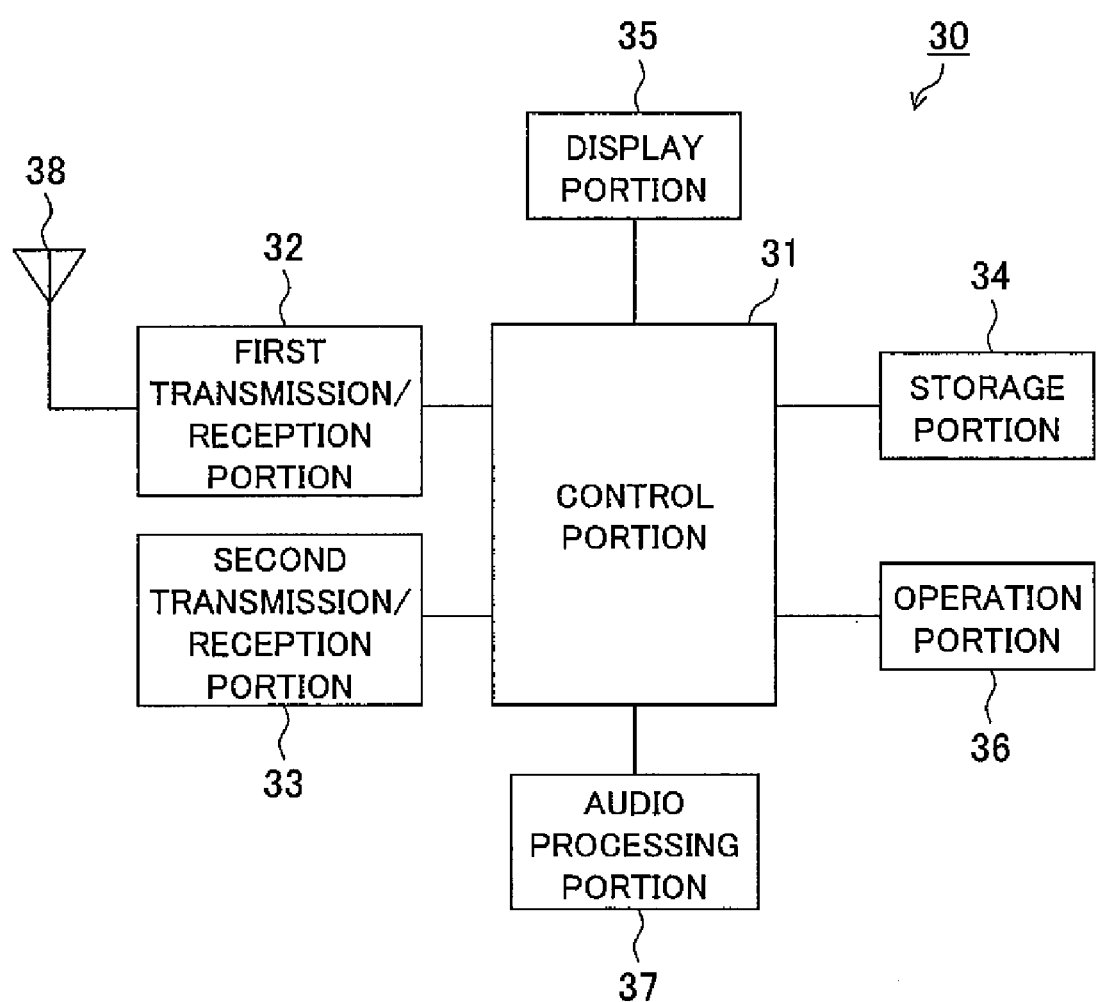
FIG. 2 is a block diagram showing a basic configuration of a mobile phone according to the present embodiment.

FIG. 2 is a block diagram showing the basic configuration of the mobile phone according to the present embodiment.

The mobile phone 30 has a first transmission/reception portion 32 capable of performing transmission/reception with a not shown base station connected to the communication network 50 under the control of the control portion 31, a second transmission/reception portion 33 performing wireless communication in a narrow band with the vehicle equipment 21 of the vehicle 20, a storage portion 34 storing the inherent ID information a for the vehicle equipment 21, a display portion 35 such as liquid crystal display device, an operation portion 36 including ten-keys etc., and an audio processing portion 37 including a speaker and a microphone.

The first transmission/reception portion 32 is connected with an antenna 38 and enables speech, mail, and other communication with the transmission destination device 40 configuring another mobile phone via the communication network 50.

For example, in the case of speech, an audio signal transmitted from the transmission destination device 40 via the communication network 50 is received via the antenna 38 at the first transmission/reception portion 32 in the mobile phone 30, converted to audio information at the audio processing portion 37, and released as sound from the speaker. By converting the audio information collected from the microphone to a signal at the audio processing portion 37, sending it to the first transmission/reception portion 32, and transmitting it from this first transmission/reception portion 32 via the antenna 38 to the communication network 50, speech can be carried out.

Further, in the case of mail, packet signals transmitted from the transmission destination device 40 via the communication network 50 are received via the antenna 38 at the first transmission/reception portion 32 in the mobile phone 30, whereupon the mail information is stored in the storage portion 34. The mail information stored in the storage portion 34 is read out based on an input operation from the operation portion 36 whereby the mail information can be displayed in the display portion 35. By transmitting the mail information prepared based on the input operation from the operation portion 36 from the first transmission/reception portion 32 via the antenna 38 to the communication network 50, mail can be transmitted.

Further, when speech or mail is received at the first transmission/reception portion 32, the control portion 31 stores the reception history in the storage portion 34. It further stores the transmission history in the storage portion 34 when speech or mail is transmitted from the first transmission/reception portion 32.

On the other hand, the second transmission/reception portion 33 includes a modularized wireless circuit and antenna and transmits the inherent ID information a for the vehicle equipment 21 stored in the storage portion 34 via the second transmission/reception portion 33 to the vehicle equipment 21. The history information HI transmitted from the vehicle equipment 21 is received via the second transmission/reception portion 33.

Further, a data area DA30 is provided in the storage portion 34.

The display portion 35 and audio processing portion 37 function as the announcement portion. The system is controlled so that when receiving the history information HI, the display portion 35 is made display this fact or speech or an announcement sound is generated.

Figure 3:
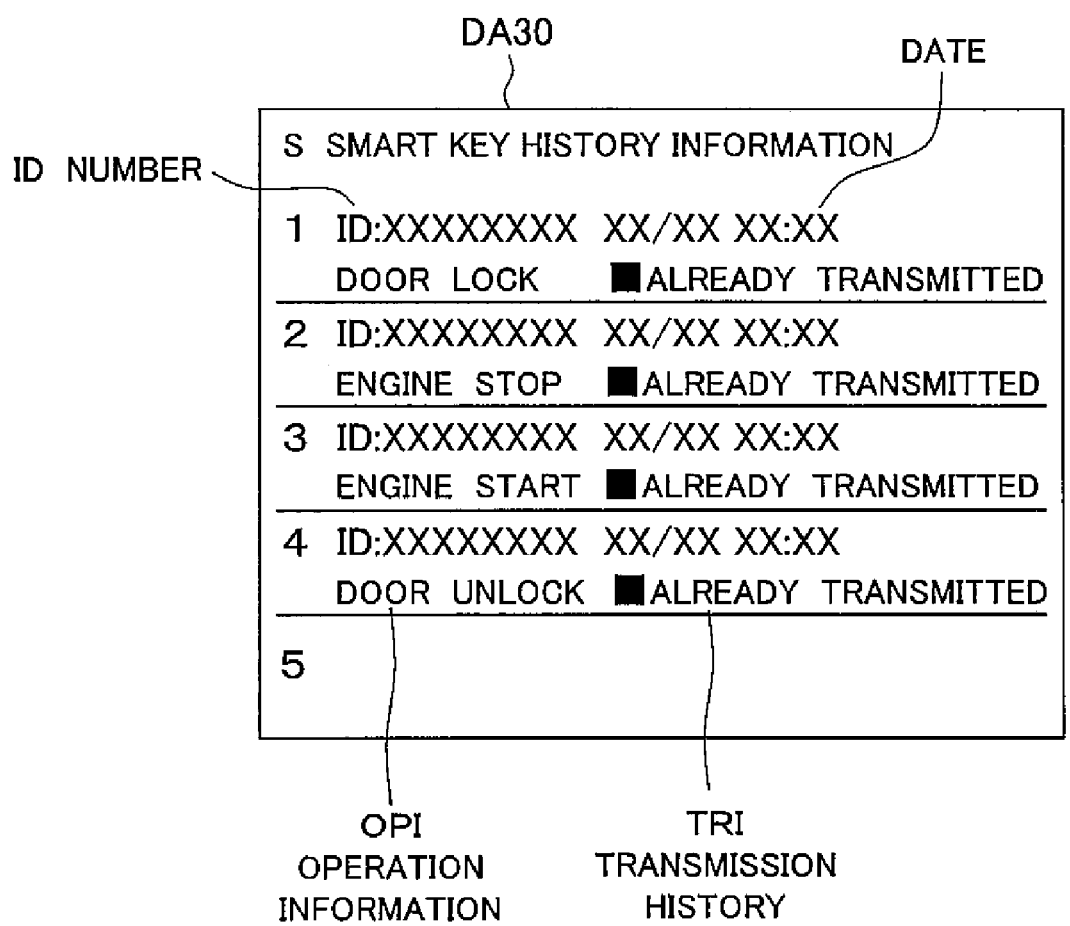
FIG. 3 is a diagram showing an example of information of a data area of the mobile phone of the present embodiment or a transmission destination device.

FIG. 3 is a diagram showing an example of displaying the information of the data area of the mobile phone of the present embodiment in the display portion.

In the present embodiment, the data area DA30 of the mobile phone 30 registers (stores) the ID number, date, engine stop, engine start, door unlock, and other operation information OPI and information indicating whether or not the usage history has been already transmitted from the mobile phone 30 (transmission history information TRI) and enables it to be read out to the display portion 35 for display.

Figure 4:
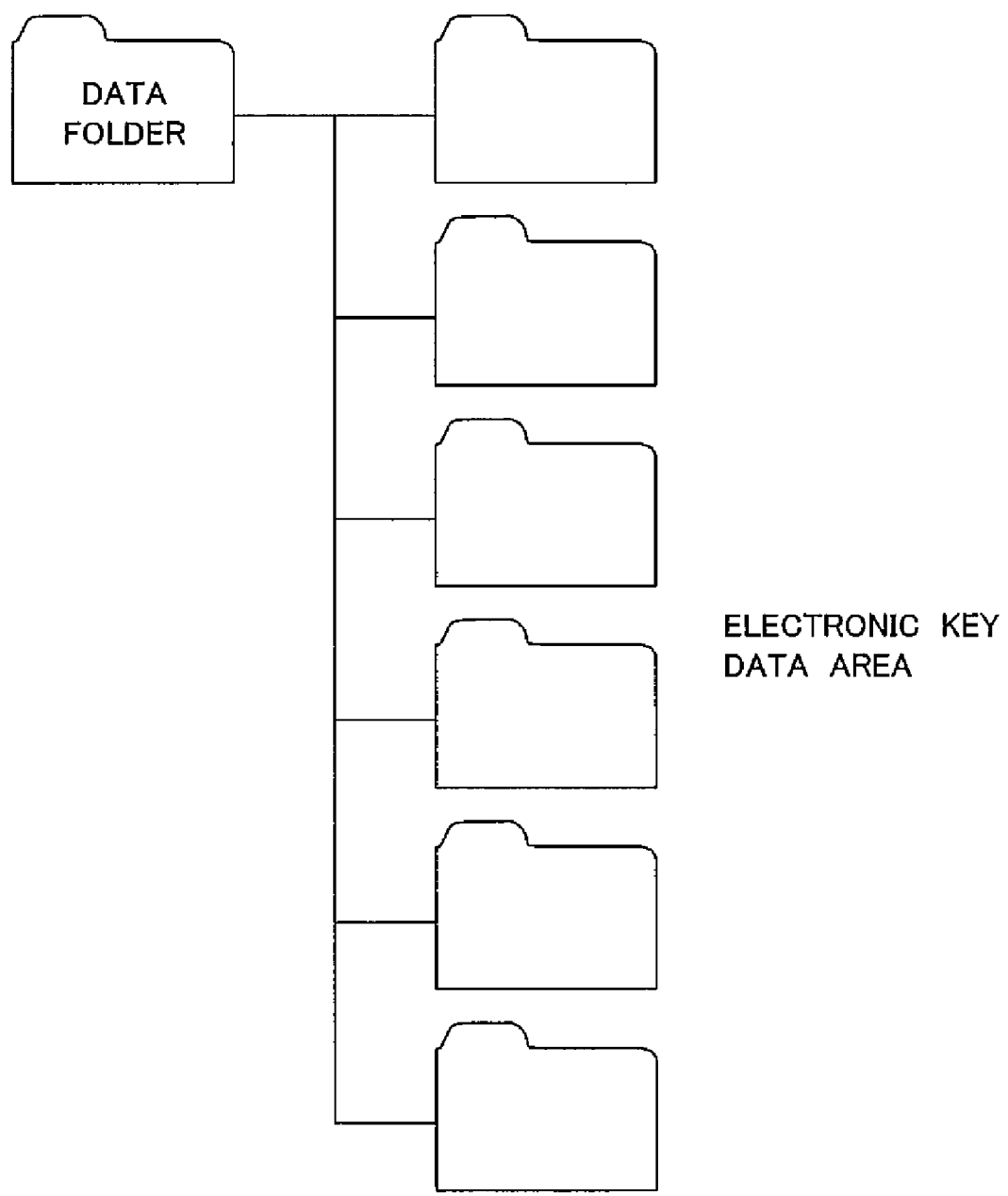
FIG. 4 is a diagram showing an example of how the data area is provided.

FIG. 4 is a diagram showing an example of how the data area is provided.

In the mobile phone 30, in order to facilitate the provision of the electronic key function equipped with the management history, one file of a data folder secured in the storage portion 34 of the mobile phone 30 is set as a "history" storage area (data area). Note, it is also possible to newly prepare a data area.

In this way, the system for preserving the history enables "unlocked", "locked", "engine started", "engine stopped", and other information (only alternative simple information) of the electronic key for door handles of the car, the engine, and other locations where unlocking and starting by the electronic key are possible and the ID code number and, operation date of the used electronic key to be recognized and automatically transmits the information to the mobile phone 30 of the owner of the vehicle 20.

Figure 5:
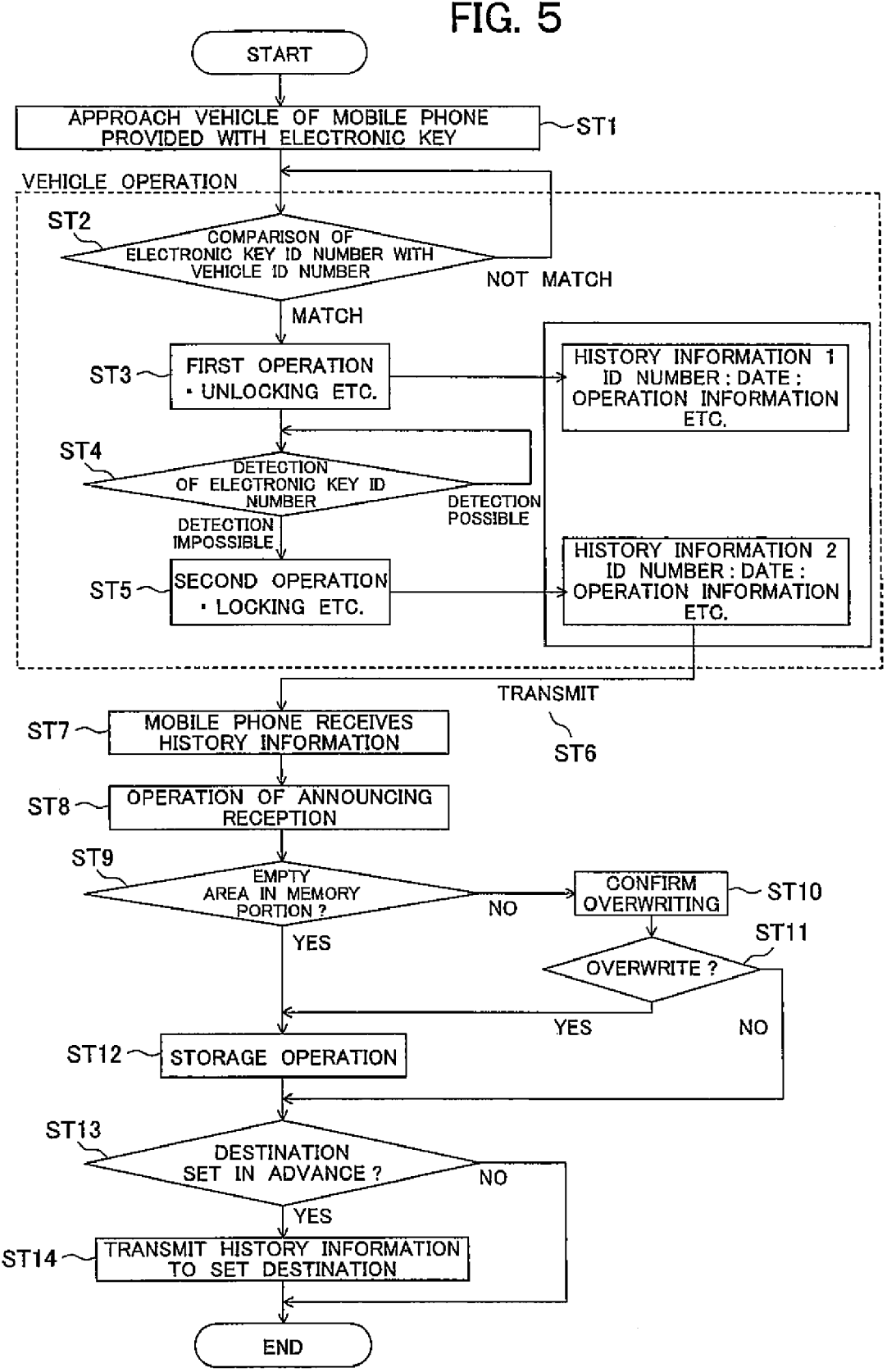
FIG. 5 is a flow chart for explaining an example of operation in a case where the mobile phone is used as an electronic key.

Next, an example of an operation where the mobile phone 30 is used as an electronic key will be explained based on the flow chart of FIG. 5.

First, the user approaches the vehicle 20 while carrying the mobile phone 30 provided with the electronic key function (ST1). The inherent ID information a is transmitted to the vehicle equipment 21 of the vehicle 20 from the mobile phone 30.

In the vehicle equipment 21, the ID number a of the electronic key and the vehicle standard ID number b are compared (ST2). When the both ID information is corresponding, the vehicle equipment 21 performs a first operation such as unlocking by the door lock device 22 (ST3) and selects history information 1 thereof (ST6).

At this time, as the history information 1, the ID number, date, operation information etc. are included.

Next, the vehicle equipment 21 detects the electronic key ID number (ST4), performs a second operation such as locking in the case where detection is not possible (including the case where the both ID isn't corresponding) (ST5), and selects the history information 2 thereof (ST6).

At this time, as the history information 2, the ID number, date, operation information etc. are included.

In the mobile phone 30, the history information 1 and 2 are received from the second transmission/reception portion 33 (ST7), and the operation of announcing the reception (including, for example, display operation) is carried out (ST8).

Then, when the mobile phone 30 receives the information, it is checked whether or not there is an empty region of capacity in the storage portion 34 (data area DA30) storing the information of the electronic key (ST9).

When there is no empty region, the operation becomes overwriting. When overwriting is carried out, the routine shifts to a storage operation (ST10 to ST12).

The storage operation is not carried out when overwriting is not carried out. If there is a previously set transmission destination device 40 (ST13), the history information is transmitted to the transmission destination device 40 from the first transmission/reception portion 32 via the communication network 50 (ST14).

On the other hand, when it is judged at step ST9 that there is an empty area in the history information data area DA30, the routine becomes a storage operation (ST12). Then, if there is a transmission destination device 40 set in advance (ST13), the history information is transmitted to the transmission destination device 40 from the first transmission/reception portion 32 via the communication network 50 (ST14).

As explained above, the electronic key system of the present embodiment has a vehicle 20 equipped with the vehicle equipment 21, a mobile phone 30 provided with an electronic key function including the inherent ID information a for the vehicle equipment, and a previously set transmission destination device (personal computer, mobile phone, etc.) 40 to which the mobile phone 30 transmits history information received from the vehicle 20. The vehicle equipment 21 of the vehicle 20 compares the ID information a of the electronic key provided as the mobile phone 30 with the standard ID information b of the vehicle equipment 21 and makes the vehicle 20 equipped with the vehicle equipment and/or the attached equipment equipped with the vehicle 20 performs a first operation when the two information is corresponding. When the ID information cannot be detected, it makes the vehicle 20 equipped with the vehicle equipment 21 and/or the attached equipment equipped with the vehicle 20 performs a second operation. Further, the vehicle equipment 21 has the function of transmitting history information along with the first and second operations to the mobile phone 30. Accordingly, the following effects can be obtained.

When the mobile phone 30 communicates with the vehicle equipment 21, that information can be received at the mobile phone 30, therefore the user can confirm the usage history of the vehicle 20, and the received vehicle information can be transmitted to the destination set in advance.

Accordingly, histories of the operation of the vehicle 20 equipped with the vehicle equipment 21 and the operation of the attached equipment equipped with the vehicle 20 can be confirmed.

Note that it is also possible to configure the present invention by using a card medium which can be attached/detached to/from the mobile phone 30, for example, a memory card medium. The mobile phone 30 has transmission/reception portions performing wireless communication with the vehicle equipment 21, stores the inherent information inherent to the vehicle equipment 21, and, when the card medium is inserted in the mobile phone 30, enables communication with the vehicle equipment 21 and instructs to store the history information transmitted from the vehicle equipment 21. By the insertion of the card medium into the mobile phone 30, wireless communication with the vehicle equipment 21 is enabled.

In this case, for example, even when the card medium and vehicle are loaned to another person, it becomes possible to learn the usage history.

INDUSTRIAL APPLICABILITY

In the electronic key system, portable wireless device, and vehicle management method of the present invention, histories of operation of the vehicle equipped with the vehicle equipment and the operation of the attached equipment equipped with the vehicle can be confirmed. Therefore, these can be applied to vehicle management using, for example, a vehicle use electronic key.

The invention claimed is:

1. An electronic key system controlling an operation of a vehicle equipped with a vehicle equipment with wireless communication between the vehicle equipment and a portable wireless device having an electronic key function including operation ID information for the vehicle equipment, wherein the vehicle equipment compares the operation ID information provided by the portable wireless device with standard operation ID information of the vehicle equipment, makes the vehicle and/or the vehicle equipment perform a first operation when the operation ID information provided by the portable wireless device matches the standard operation ID information, makes the vehicle and/or the vehicle equipment perform a second operation when the operation ID information does not match the standard operation ID information, and transmit history information accompanying the first and second operations to the portable wireless device, wherein the history information includes previous vehicle operations according to the electronic key function.

2. An electronic key system as set forth in claim 1, wherein the portable wireless device has an announcement portion announcing that the history information is received from the vehicle equipment.

3. An electronic key system as set forth in claim 1, wherein when receiving the history information from the vehicle equipment, the portable wireless device transmits the history information to a destination set in advance.

4. An electronic key system as set forth in claim 2, wherein when receiving the history information from the vehicle equipment, the portable wireless device transmits the history information to a destination set in advance.

5. A portable wireless device having an electronic key function including operation ID information for a vehicle equipment, the portable wireless device comprising
- a transmission/reception portion performing wireless communication with the vehicle equipment, wherein the operation ID information is provided by the portable wireless device to the vehicle equipment and is compared with standard operation ID information of the vehicle equipment, the vehicle equipment performing a first operation when the operation ID information matches the standard operation ID information and a second operation when the operation ID information does not match the standard operation ID information,
- a storage portion storing at least a history information received from the vehicle equipment accompanying the first and second operations, wherein the history information includes previous vehicle operations according to the electronic key function,
- an announcement portion, and
- a control portion receiving the history information via the transmission/reception portion from the vehicle equipment when performing wireless communication with the vehicle equipment based on the electronic key function, storing the received history information in the storage portion, and announcing the reception of the history information via the announcement portion.

6. A portable wireless device as set forth in claim 5, wherein the history information is formed so that it can be displayed via the announcement portion.

7. A portable wireless device as set forth in claim 5, wherein when the history information is received, the history information is transmitted to a destination set in advance.

8. A portable wireless device as set forth in claim 6, wherein when the history information is received, the history information is transmitted to a destination set in advance.

9. A vehicle management method for managing a history of operation of a vehicle equipped with a vehicle equipment with wireless communication between the vehicle equipment and a portable wireless device having an electronic key function including operation ID information for the vehicle equipment, comprising,
- in the vehicle equipment, comparing the operation ID information provided by the portable wireless device with standard operation ID information of the vehicle equipment and,
- when the operation ID information provided by the portable wireless devices matches the standard operation ID information, making the vehicle and/or the vehicle equipment perform a first operation,
- when the operation ID information does not match the standard operation ID information, making the vehicle and/or the vehicle equipment perform a second operation, and
- transmitting a history information accompanying the first and second operations to the portable wireless device, wherein the history information includes previous vehicle operations according to the electronic key function.

10. A vehicle management method as set forth in claim 9, further comprising
- in the portable wireless device, announcing that the history information is received from the vehicle equipment.

11. A vehicle management method as set forth in claim 9, further comprising
- in the portable wireless device, transmitting the history information to a destination set in advance when the history information is received from the vehicle equipment.

12. A vehicle management method as set forth in claim 10, further comprising
- in the portable wireless device, transmitting the history information to a destination set in advance when the history information is received from the vehicle equipment.

* * * * *